R. E. BATES.
PNEUMATIC SHOCK ABSORBER.
APPLICATION FILED OCT. 15, 1913.

1,105,953.

Patented Aug. 4, 1914.

WITNESSES
L. Douville,
O. F. Nagle.

INVENTOR
Ralph E. Bates.
BY
Wiedersheim & Fairbanks
ATTORNEYS

UNITED STATES PATENT OFFICE.

RALPH E. BATES, OF PHILADELPHIA, PENNSYLVANIA, ASSIGNOR, BY MESNE ASSIGNMENTS, TO AUTOMOBILE DEVELOPMENT COMPANY, OF PHILADELPHIA, PENNSYLVANIA, A CORPORATION OF DELAWARE.

PNEUMATIC SHOCK-ABSORBER.

1,105,953.

Specification of Letters Patent. Patented Aug. 4, 1914.

Application filed October 15, 1913. Serial No. 795,206.

*To all whom it may concern:*

Be it known that I, RALPH E. BATES, a citizen of the United States, residing in the city and county of Philadelphia, State of Pennsylvania, have invented a new and useful Pneumatic Shock-Absorber, of which the following is a specification.

My invention consists of a pneumatic shock-absorber in which the movements of a vehicle in traveling will compress air to cushion shocks caused by inequalities in the road over which the vehicle travels.

It further consists of such a device in which such compressed air is accumulated to provide air-cushions to absorb the shocks from inequalities in the road and its pressure adjusted according to the load carried.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

Figure 1:
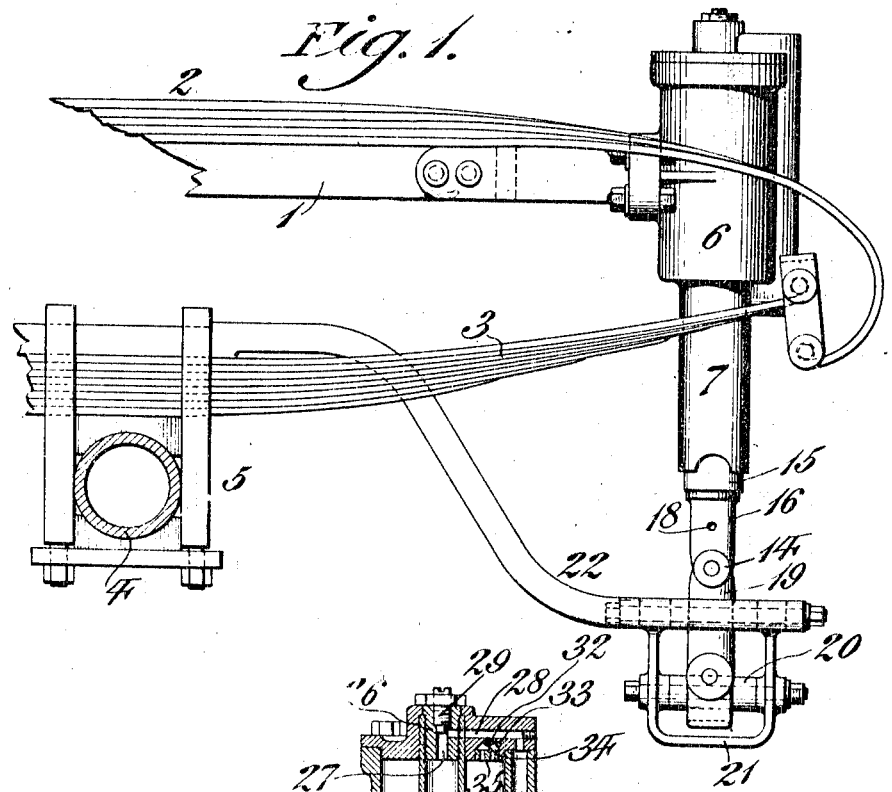
Figure 2:
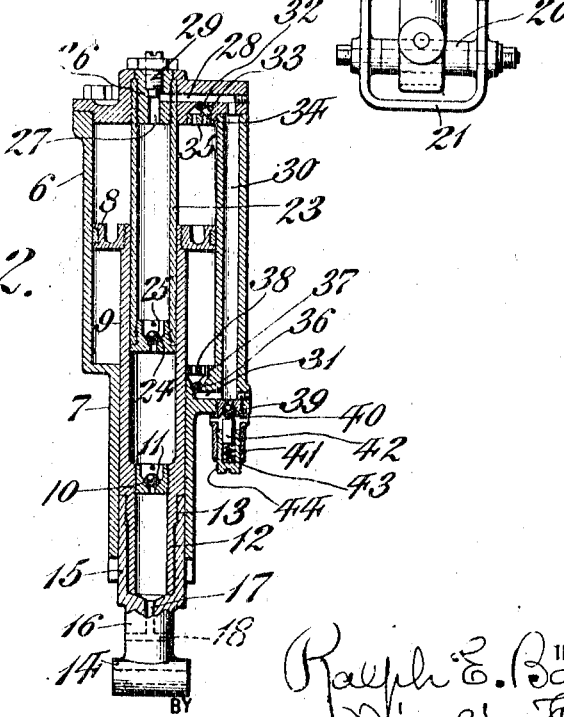

In said annexed drawings—Figure 1 represents a side elevation of as much of a spring, side-bar of the chassis and axle support of an automobile as will illustrate the application of my improved shock absorber. Fig. 2 represents an axial section of the absorber.

Similar numerals of reference indicate corresponding parts in the figures.

Referring to the drawings, the reference numeral 1 indicates a side-bar of the chassis of an automobile, to which is secured the upper member, 2, of a spring of any suitable or desired construction, the lower member, 3, of which spring is secured to the axle, 4, by a clip, 5, in the usual or any preferred manner.

A cylinder, 6, is vertically secured to the end of the side-bar to form a cushion-chamber and has a tubular bearing, 7, of smaller diameter, extending from its lower head. An annular piston, 8, is slidable in said cylinder to form a movable cushion member, and has a tubular piston-rod, 9, forming a movable plunger-cylinder, slidable in the tubular bearing. Said plunger-cylinder has a valve-seat, 10, a distance from the lower end of the rod and in its (the plunger-cyl-
inder's) lower end, upon which seat an upwardly-opening inlet-valve,—in the present instance a ball-valve, 11,—is seated. The lower end of the tubular piston-rod is reduced, as at 12, and has an external screw-thread, 13, and a T-head, 14, having a socket, 15, in its shank, 16, is secured upon said reduced end, having a portion internally screw-threaded, and said socketed shank slides in the lower end of the tubular bearing of the piston-cylinder. The bottom of the socket has an axial bore, 17, communicating with the atmosphere through a transverse bore, 18, through the shank, said bores forming an air-inlet. Links, 19, are pivotally connected to the T-head and are pivotally connected at their lower ends to a swivel, 20, pivoted to have transverse play in a stirrup, 21, pivotally suspended from the end of a bracket, 22, secured to the axle by the spring-clip or by any other suitable means.

A tubular plunger, 23, axially projects from the upper head of the piston-cylinder into the movable plunger-cylinder of the piston-rod, and said plunger has a seat, 24, in its lower end, upon which a valve,—in the present instance a ball-valve, 25,—has its seat and upward play.

A plug, 26, is secured in the upper head of the piston-cylinder and closes the upper end of the tubular plunger, and said plug has an axial bore 27, which communicates with a radial bore, 28, extending outward through the head. A controlling screw-valve, 29, is provided, which controls the angular passage at the angle of the same, and the supply of air compressed by the movements of the vehicle can be controlled by said valve.

A vertical passage, 30, extends from the radial passage in the upper head of the piston cylinder to the lower head of the same, and the lower end of said passage has a radial passage, 31, entering the lower head of the piston cylinder. The upper radial passage has an opening, 32, which has a valve-seat, 33, against which seats an upwardly closing valve, 34,—in the present instance a ball-valve,—leading into the piston-cylinder, and the ball is confined by a suitable cage structure, 35. A valve-seat, 36, is provided in the lower radial passage, and a valve,—in the present instance a ball-valve, 37,—is seated upon said seat to open into the lower end of the piston-cylinder, and is confined by a cage-structure, 38.

A valve-seat, 39, is provided in the lower end of the vertical passage 30, and has a valve, 40, seated against the same and opening downward, and a casing, 41, is secured around said seat and contains a plunger, 42, and a spring, 43, bearing against said plunger to force the same against the valve. The spring is contained in a socket, 44, threaded in the casing to control the pressure of the spring and, consequently, the pressure of the plunger against the ball-valve.

In practice, when the vehicle is at rest, both ends of the piston-cylinder contain air under normal atmospheric pressure. As soon as the vehicle is started and movement of the axle is caused, the piston-rod is reciprocated, and the reciprocations of the piston-rod will cause the stationary plunger to draw in air through the lower end of the piston-rod through the intake of the cross-head of the same and compress such air, sending the same through the passage in the head of the piston-cylinder to the upper end of the latter and through the vertical passage to the lower end. The compressed air in the ends of the piston-cylinder will check and absorb any sudden shocks imparted to the axle, cushioning the same, and the more obstructions are met in the road by the wheels of the vehicle and the more reciprocations are thus caused to the piston-rod and its movable plunger-cylinder, the more air will be drawn into such cylinder and compressed into the ends of the piston cylinder, in which the shocks caused by meeting obstructions will be met and cushioned by the air thus compressed and increasingly compressed according to the roughness of the road. The compression of air can be controlled by the valve 29, and any predetermined maximum pressure can be adjusted by the adjustment of pressure of the plunger 42 against the ball-valve 40, so that said valve will blow off surplus pressure whenever a pressure exceeding the predetermined cushioning pressure is attained. There will be no more than atmospheric pressure in the piston-cylinder which cushions the movement of the axle, unless the vehicle is moving, and the greater the movement of the vehicle is, owing to irregularities in the road, the greater will be the cushioning pressure.

In earlier devices intended for absorbing shocks in motor-propelled vehicles, springs have been employed, or cylinders and pistons acting in the same against atmospheric pressure, but springs maintain the same tension at all times, and atmospheric pressure is limited to the amount of compression acting at the moment and is not accumulated in accordance with the demands upon the same, nor can the amount of pressure be greater than that caused by reduction in volume of normal atmospheric pressure. The present shock-absorber will cushion against upward rebound as well as against downward movement of the chassis and body, and will thus insure smooth riding. As the piston rod does not have any packing in the long tubular bearing of the piston-cylinder, air can leak out between said rod and bearing to blow away any accumulations of dust upon the piston-rod, and compressed air can leak out of the cylinder when the vehicle is not running.

Other modes of applying the principle of my invention may be employed for the mode herein explained. Change may therefore be made as regards the mechanism thus disclosed, provided the principles of construction set forth, respectively, in the following claims are employed.

Having thus described my invention, what I claim as new and desire to secure by Letters Patent, is:—

1. A shock-absorber, comprising a cylinder, a piston mounted to reciprocate therein, an air compressing element connected with the cylinder, a second air compressing element connected with the piston to move therewith and coöperating with the first-named air-compressing element, and means of communication between one air compressing element and the cylinder upon opposite sides of the piston.

2. A shock-absorber, comprising a cylinder, a piston mounted to reciprocate therein, an air compressing element connected with the cylinder, a second air compressing element connected with the piston to move therewith and coöperating with the first-named air compressing element, means of communication between the first-named air compressing element and the ends of the cylinder upon opposite sides of the piston, and adjustable means for regulating the air pressure of the coöperating air compressing elements.

3. A shock absorber, comprising a cushion chamber, a cushion member mounted therein one movable with relation to the other, an air compressing device comprising an element connected with the cushion chamber and a second element connected with the cushion member, and means of communication between the air compressing device and the cushion chamber upon opposite sides of the cushion member.

4. A shock-absorber, comprising a cushion chamber and a cushion member in the same, one of said members movable in its relation to the other and each, respectively, adapted to be connected to a rigid and a movable part of a vehicle, an air-compressing device having its members respectively connected to said cushioning members and communicating with said cushion chamber at opposite sides of said cushion member, and means for regulating the air-pressure of said air-compressing device.

5. A shock-absorber, comprising a piston-cylinder, a piston reciprocable in said cylinder and having a tubular rod forming a plunger cylinder, said cylinder and rod being each adapted to be connected to a rigid and a movable part of a vehicle, an inwardly opening valve in said plunger-cylinder, a tubular plunger in said plunger-cylinder and secured in the head of said cylinder, an inwardly opening valve in the end of said plunger, a duct communicating with the interior of said plunger and with the ends of the piston-cylinder, and valves at the ends of said duct and opening into the piston-cylinder.

6. A shock-absorber, comprising a piston-cylinder, a piston reciprocable in said cylinder and having a tubular rod forming a plunger cylinder, said cylinder and rod being each adapted to be connected to a rigid and a movable part of a vehicle, an inwardly opening valve in said plunger-cylinder, a tubular plunger in said plunger-cylinder and secured in the head of said cylinder, an inwardly opening valve in the end of said plunger, a duct communicating with the interior of said plunger and with the ends of the piston-cylinder, valves at the ends of said duct and opening into the piston-cylinder, and an adjustable valve in said duct adapted to control the same.

7. A shock-absorber, comprising a piston-cylinder, a piston reciprocable in said cylinder and having a tubular rod forming a plunger cylinder, said cylinder and rod being each adapted to be connected to a rigid and a movable part of a vehicle, an inwardly opening valve in said plunger-cylinder, a tubular plunger in said plunger-cylinder and secured in the head of said cylinder, an inwardly opening valve in the end of said plunger, a duct communicating with the interior of said plunger and with the ends of the piston-cylinder, valves at the ends of said duct and opening into the piston-cylinder, an outwardly opening spring-pressed valve in said duct, and means for adjusting the spring-pressure against said valve.

8. A shock-absorber, comprising a piston-cylinder, a piston reciprocable in said cylinder and having a tubular rod forming a plunger cylinder, said cylinder and rod being each adapted to be connected to a rigid and a movable part of a vehicle, an inwardly opening valve in said plunger-cylinder, a tubular plunger in said plunger-cylinder and secured in the head of said cylinder, an inwardly opening valve in the end of said plunger, a duct communicating with the interior of said plunger and with the ends of the piston-cylinder, valves at the ends of said duct and opening into the piston-cylinder, an outwardly opening spring-pressed valve in said duct, means for adjusting the spring-pressure against said valve, and an adjustable valve in said duct adapted to control the air-passage through the same.

9. A shock absorber, comprising a cylinder provided at its lower end with a reduced tubular bearing, a piston mounted to reciprocate within the cylinder, a tubular piston rod connected with the piston and passing through the tubular bearing and outwardly beyond the same with its interior in communication with the atmosphere, an upwardly opening valve arranged within the tubular piston rod, a tubular plunger connected with the head of the cylinder and extending into the tubular piston rod, an upwardly opening valve arranged within the tubular plunger, and means of communicating between the tubular plunger and cylinder.

RALPH E. BATES.

Witnesses:
 Jos. G. Denny, Jr.,
 Ansley H. Fox.